3,227,278
VARIABLE AREA INLET WELL FOR
SETTLING TANKS
Carl Robert Johnson, Morton Grove, Ill., assignor to Universal Oil Products Company, Des Plaines, Ill., a corporation of Delaware
Filed Dec. 15, 1961, Ser. No. 159,729
7 Claims. (Cl. 210—101)

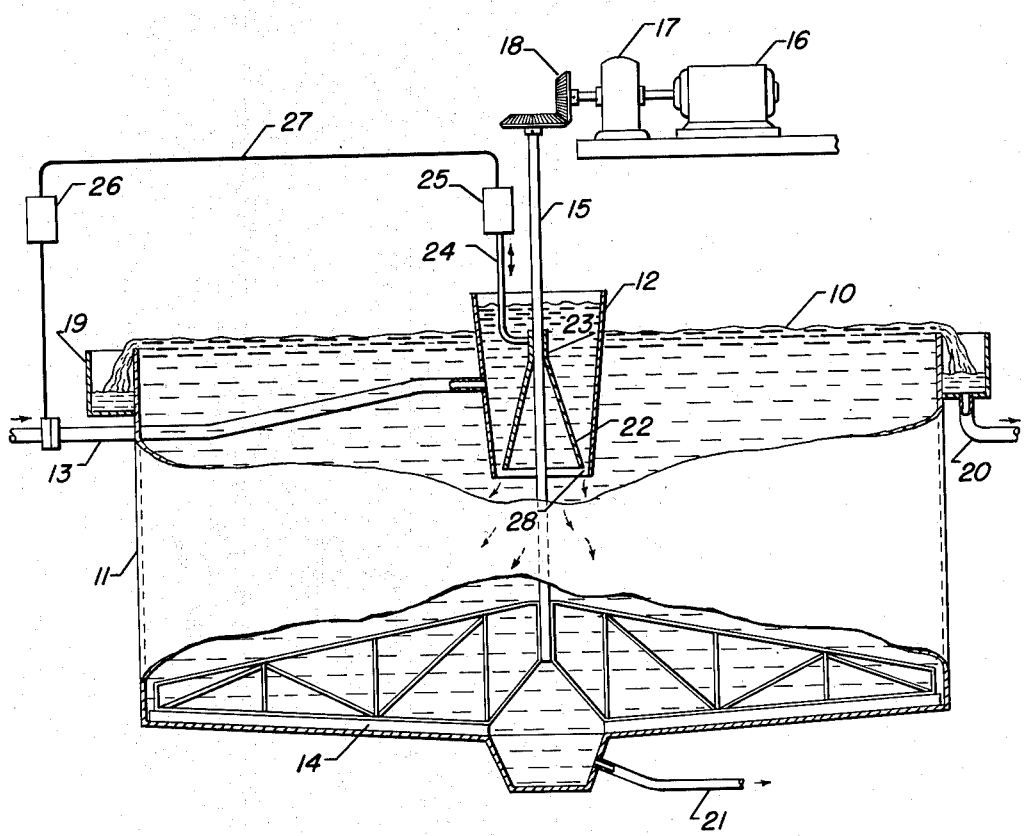

This invention relates to an inlet well or liquid feed distributor for circular clarifiers and sedimentation tanks employed in the treatment of industrial and municipal waste products. More particularly, the present invention is directed to an improved liquid feed distributor for handling feeds of high solids content and widely varying charge rate.

Settling basins, sedimentation tanks, clarifiers, oil separators and the like are commonly utilized in the gravity separation of large quantities of aqueous slurries, suspensions and emulsions. Exemplary services include the purification of effluent water from petroleum refinery process units or chemical plants, the purification of municipal sewage, the separation of catalyst-oil slurries, and the classification of mineral ores. Such vessels are typically of large dimension: industrial units may range in diameter from 30 to 80 feet, and municipal sewage treating units are constructed up to about 150 feet or more in diameter. To obtain maximum separation of sludge or oil from the main body of liquid, it is highly desirable to provide an initial downflow velocity of liquid feed which is as uniform as possible with respect to vessel diameter. When the liquid feed is charged to the vessel from a central inlet conduit, the situation is that of a point source of inflowing material surrounded by a large, relatively quiescent body of liquid; quite obviously, any nonuniformity in the initial downflow velocity of the feed will be amplified by local discontinuities in diffusion rates, temperature strata, and backeddies produced by the sludge scraper blade so that as one moves radially outward from the feed inlet point the probability of finding a circumferentially uniform downflow velocity is extremely remote. One means of providing good distribution of flow is the perforated plate distributor. However, as the distributor orifices tend to become easily plugged by entrained solids, its sphere of application is usually limited to liquid feeds of relatively low solids content.

It is therefore an object of this invention to provide an inlet well of improved design which affords substantially uniform distribution of flow into the liquid-liquid or liquid-solid separation zone.

A further object of the present invention resides in the provision of liquid feed distribution apparatus which is capable of handling liquid feeds containing large quantities of entrained solids without becoming subject to plugging.

A broad embodiment of the present invention relates to a feed distributor for a liquid clarification tank comprising a casing centrally positioned within said tank and extending vertically above and below the plane of the normal liquid level therein, the lower end of said casing being open and the internal transverse cross sectional area of the casing increasing with increasing height above said lower end, a flow-obstructing baffle member centered within and spaced from said casing and movable in a vertical direction, at least that portion of the baffle member which is closest to the casing being geometrically similar to the adjacent portion of the casing to provide a peripheral passageway between baffle member and casing of substantially uniform width around its periphery, positioning means connecting with said baffle member for varying its elevation with respect to said casing, and a liquid inlet conduit connected to the casing and communicating with the interior thereof above said passageway.

A more specific embodiment of this invention is directed to a feed distributor for a liquid clarification tank comprising an open-ended inverted frusto-conical casing centrally positioned within said tank and extending vertically above and below the plane of the normal liquid level therein, a conical flow-obstructing baffle radially centered within and spaced from said casing and movable in a vertical direction along the central longitudinal axis of the casing, the outside diameter of said conical baffle increasing with decreasing height above its base to provide an annular passageway between the lower peripheral edge of the baffle and said casing, positioning means connecting with said baffle for varying its elevation with respect to said casing, and a liquid inlet conduit connected to the casing and communicating with the interior thereof above said annular passageway.

These and other embodiments and modifications of the invention will be apparent in the light of the following discussion and from inspection of the accompanying drawing, to which reference may now be had. It is intended that the drawing is presented as illustrative of the best mode of practicing the invention, but not with a view of unduly limiting its generally broad scope.

In the drawing there is shown a sectional elevation view of the inlet well showing its relationship to a continuous thickener or sedimentation unit of conventional design with which it is employed.

The continuous thickener comprises a circular settling basin or clarification tank 11 which contains the main body of liquid wherein the steps of liquid clarification and sludge accumulation are being carried out. The inlet well comprises a stationary open-ended frusto-conical casing 12 which is centrally positioned within tank 11 and which extends above and below the plane of the normal liquid level therein, indicated at 10. A feed inlet conduit 13 extends horizontally across tank 11 and connects with casing 12 at about its midsection to provide fluid communication with the interior thereof. A sludge scraper blade or rake 14 is rotatably mounted in the lower portion of tank 11; rake 14 is driven by a vertically extended shaft 15 which in turn is rotated by motor 16 through speed reducer 17 and gearing 18. An overflow launder 19 surrounds the upper peripheral edge of tank 11, which edge forms a circumferential weir skimming clarified liquid into the launder; clarified liquid is withdrawn from launder 19 through conduit 20. A sludge-rich underflow is withdrawn from the bottom of tank 11 through conduit 21.

An imperforate conical baffle 22 is radially centered within casing 12; the upper end of baffle 22 is provided with a neck portion or sleeve 23 which has a cylindrical bore therethrough to receive shaft 15 in rotational and translational sliding contact therewith. A yoke member 24 connected to sleeve 23 functions to raise and lower baffle 22 in a vertical direction in response to a suitable actuating means which may be a rack-and-pinion or handwheel drive, or, as here shown, a pneumatic or hydraulic positioner such as operator 25. Baffle 22 is thus supported and guided in vertical alignment by shaft 15, the latter being free to rotate while the baffle is movable vertically.

Baffle 22 may be operated manually or automatically in response to an appropriate signal. As herein illustrated, such automatic signal may be obtained from a flow transmitter or other flow sensitive primary measuring element 26 operatively connected to feed inlet conduit 13; a signal responsive to the liquid feed rate is transmitted via line 27 to operator 25. Such flow signal may be pneumatic, electronic, etc., and may be proportional to the instantaneous flow rate, or proportional to the square of such flow rate, or any other suitable mathematical relationship therebetween may be utilized, depending upon the characteristic of the primary measuring element.

The outside diameter of baffle 22 at its base is slightly smaller than the inside diameter of casing 12 at the same elevation so that there results an annular passageway 28 between the lower peripheral edge of the baffle and the casing. As baffle 22 is raised the width and free area of passageway 28 is increased by reason of the conical shape of casing 12, and conversely as baffle 22 is lowered; for a given baffle elevation, however, the width of passageway 28 is uniform with respect to its circumference.

The tapered upstream surface of baffle 22 fulfills two important functions. Firstly, it eliminates the possibility of solids retention with resultant plugging of passageway 28 since there is no horizontal surface on which suspended solids may accumulate. Secondly, it forms in conjunction with the longitudinal wall of casing 12 of a liquid acceleration zone of smoothly decreasing cross section so that the net head loss due to exit effects through passageway 28 is minimized.

Respecting the operation of the inlet well, an influent feed stream comprising a suspension of sludge in water or other liquid is charged through conduit 13 into the interior of casing 12 and is discharged therefrom as a downwardly directed cylindrically or conically shaped jet into the main body of liquid in tank 11. The liquid head required to provide flow through passageway 28 is reflected in a difference in elevation between the liquid level within casing 12 and the liquid level in tank 11; this difference in elevation may be advantageously utilized to effect a primary oil skimming of the feed, as hereinafter explained. In the event that the feed rate should increase, operator 25 then raises baffle 22 in response to the signal from flow transmitter 26, thereby reducing the flow resistance of passageway 28 and avoiding overflow of liquid from the upper open end of casing 12 into tank 11.

If the feed stream comprises a mixture of oil and water, the present invention affords a simple means of removing a substantial portion of the oil before the feed is charged to the main clarification zone. In such case, an overflow launder similar to launder 19 may be provided around the upper exterior surface of casing 12 to receive oil spilling over the upper circumferential edge thereof. When the feed stream discharges from conduit 13 into the interior of casing 12, the reduced velocity permits a substantial degree of separation as between oil and water to be effected therein. An oil-lean phase may then be discharged downwardly through passageway 28, while an oil-rich phase accumulates as a layer at the upper end of casing 12 and may then be skimmed by the upper edge of the casing into said peripheral launder. If desired, baffle 22 may be periodically lowered for a short interval to cause the accumulated oil layer to be dumped into the surrounding oil-receiving launder. Alternatively, the vertical position of baffle 22 may be varied in response to a signal obtained from an oil-water interface level controller.

Numerous modifications of the instant apparatus will appear obvious to those skilled in the art of continuous sedimentation and are included within the broad scope of this invention. Although the preferred shape of casing 12 is conical for reasons of lower cost and ease of manufacture, various transverse cross sectional shapes other than circular are equally satisfactory, as for example, triangular, square, rectangular or polygonal cross sections, in which event the casing will have the form of a prismoid of the appropriate number of sides, or an elliptical cross section, etc. The important consideration is that the internal transverse cross sectional area of the casing increase with increasing height above the base or lower end of the casing; the rate of change of transverse cross sectional area with height may be linear, as in the case of a straight sided or conical casing, or nonlinear as where the longitudinal wall of the casing is hyperbolic or parabolic. The upper end of casing 12 may be left open, as illustrated, or may be closed with a plate or a cap if primary oil skimming is not anticipated. The flow-obstructing baffle member 22 may also have a shape other than conical; for example it may be a cylindrical or parabolic plug member or simply a flat disc if the liquid feed is low in solids content or the solids are not likely to agglomerate. In respect of the baffle member, the main consideration is that the portion of the baffle member which is closest to the casing (e.g., the longitudinal wall of a cylindrical baffle or the edge of a plate type baffle) be geometrically similar to the adjacent wall or walls of the casing so as to provide a passageway therebetween which has a substantially uniform width for a given baffle elevation. Thus, if casing 12 should be pyramidal, baffle 22 will also be pyramidal, or, if a plate, then a polygonal plate of the appropriate number of sides. Insofar as concerns the liquid feed conduit 13, this may be connected tangentially to casing 12, if desired, to promote a more uniform pattern of flow into and across the interior thereof; two or more liquid feed conduits may be substituted for the single feed conduit, in which case they may connect with the casing at points which are uniformly spaced around its periphery.

In accordance with one embodiment of the invention, the vertical position of baffle 22 is made automatically responsive to the feed flow rate. The baffle may alternatively be actuated in response to other process variables, such as liquid level within casing 12 or differential pressure across passageway 28, by employing suitable primary measuring elements. As previously noted, the baffle may also be raised and lowered completely manually or by manual operation of an electric, pneumatic or hydraulic positioner.

I claim as my invention:

1. In combination with a liquid clarification tank having a sludge scraper blade driven by a central vertical shaft, the combination of a casing surrounding and radially centered on said shaft and extending vertically above and below the plane of the normal liquid level therein, the lower end of said casing being open and the internal transverse cross sectional area of the casing increasing with increasing height above said lower end, a flow-obstructing baffle member centered and wholly positioned within and spaced from said casing and in rotational and translational sliding contact with the said shaft, at least that portion of the baffle member which is closest to the casing being geometrically similar to the adjacent portion of the casing to provide a peripheral passageway between baffle member and casing of substantially uniform width around its periphery, positioning means connecting with said baffle member for varying its elevation on said shaft with respect to said casing, and a liquid inlet conduit connected to the casing at an intermediate point in the height thereof and communicating with the interior thereof above said passageway.

2. A feed distributor for a liquid clarification tank comprising an open-ended inverted frusto-conical casing centrally positioned within said tank and extending vertically above and below the plane of the normal liquid level therein, a conical flow-obstructing baffle member radially centered and wholly positioned within and spaced from said casing and movable in a vertical direction along the central longitudinal axis of the casing, at least that portion of the baffle member which is closest to the casing forming a surface of revolution about said longitudinal axis to provide an annular passageway between baffle member and casing, positioning means connecting with said baffle member for varying its elevation with respect to said casing, a liquid inlet conduit connected to the casing at an intermediate point in the height thereof and communicating with the interior thereof above said annular passageway and means for adjusting the elevation of said baffle member in response to liquid feed rate in said inlet conduit.

3. The apparatus of claim 1 further characterized in the provision of means for adjusting the elevation of said baffle member responsive to liquid feed rate in said inlet conduit.

4. A feed distributor for a liquid clarification tank comprising an open-ended inverted frusto-conical casing centrally positioned within said tank and extending vertically above and below the plane of the normal liquid level therein, a conical flow-obstructing baffle radially centered and wholly positioned within and spaced from said casing and movable in a vertical direction along the central longitudinal axis of the casing, the outside diameter of said conical baffle increasing with decreasing height above its base to provide an annular passageway between the lower peripheral edge of the baffle and said casing, positioning means connecting with said baffle for varying its elevation with respect to said casing, a liquid inlet conduit connected to the casing at an intermediate point in the height thereof and communicating with the interior thereof above said annular passageway and means for adjusting the elevation of said baffle member in response to liquid feed rate in said inlet conduit.

5. In combination with a liquid clarification tank having a sludge scraper blade driven by a central vertical shaft, a feed distributor for said tank which comprises in combination an open-ended inverted frusto-conical casing surrounding and radially centered on said shaft and extending vertically above and below the plane of the normal liquid level in said tank, a conical flow-obstructing baffle radially centered and wholly positioned within and spaced from said casing and in rotational and translational sliding contact with the shaft, the outside diameter of said conical baffle increasing with decreasing height above its base to provide an annular passageway between the lower peripheral edge of the baffle and said casing, positioning means connecting with said baffle for varying its elevation on said shaft with respect to said casing, and a liquid inlet conduit connected to the casing at an intermediate point in the height thereof and communicating with the interior thereof above said annular passageway.

6. The apparatus of claim 5 further characterized in that said conical baffle comprises a sleeve having a cylindrical bore through which extends said shaft in sliding contact therewith.

7. In combination with a liquid clarification tank having a sludge scraper blade driven by a central vertical shaft, a feed distributor for said tank which comprises in combination an open-ended inverted frusto-conical casing surrounding and radially centered on said shaft and extending vertically above and below the plane of the normal liquid level in said tank, a conical flow-obstructing baffle radially centered and wholly positioned within and spaced from said casing and in rotational and translational sliding contact with the shaft, the outside diameter of said conical baffle increasing with decreasing height above its base to provide an annular passageway between the lower peripheral edge of the baffle and said casing, positioning means connecting with said baffle for varying its elevation on said shaft with respect to said casing, a liquid inlet conduit connected to the casing at an intermediate point in the height thereof and communicating with the interior thereof above said annular passageway, and means for adjusting the elevation of said baffle responsive to liquid feed rate in said inlet conduit.

References Cited by the Examiner

UNITED STATES PATENTS

| | | | |
|---|---|---|---|
| 1,724,977 | 8/1929 | Stein | 137—486 X |
| 2,098,467 | 11/1937 | Sayers et al. | 210—519 |
| 2,419,693 | 4/1947 | Short et al. | 210—110 |
| 2,458,893 | 1/1949 | Campbell | 210—137 X |
| 2,502,490 | 4/1950 | Sweet | 210—97 X |
| 2,675,020 | 4/1954 | Breitwieser | 137—486 X |
| 3,002,400 | 10/1961 | Scott | 210—528 X |

FOREIGN PATENTS

| | | |
|---|---|---|
| 370,665 | 4/1932 | Great Britain. |
| 474,239 | 10/1937 | Great Britain. |

REUBEN FRIEDMAN, *Primary Examiner.*

HERBERT L. MARTIN, *Examiner.*